United States Patent
Abernathy et al.

(10) Patent No.: US 7,475,232 B2
(45) Date of Patent: Jan. 6, 2009

(54) PERFORMANCE OF AN IN-ORDER PROCESSOR BY NO LONGER REQUIRING A UNIFORM COMPLETION POINT ACROSS DIFFERENT EXECUTION PIPELINES

(75) Inventors: Christopher Michael Abernathy, Austin, TX (US); Jonathan James Dement, Austin, TX (US); Ronald Hall, Cedar Park, TX (US); Albert James Van Norstrand, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/184,349

(22) Filed: Jul. 19, 2005

(65) Prior Publication Data
US 2007/0022278 A1    Jan. 25, 2007

(51) Int. Cl.
*G06F 9/00* (2006.01)
(52) U.S. Cl. .................................................. 712/244
(58) Field of Classification Search ................. 712/244, 712/219
See application file for complete search history.

(56) References Cited

U.S. PATENT DOCUMENTS

| | | | | |
|---|---|---|---|---|
| 5,193,158 | A * | 3/1993 | Kinney et al. ............... | 712/244 |
| 5,325,495 | A * | 6/1994 | McLellan .................... | 712/219 |
| 6,047,370 | A * | 4/2000 | Grochowski ................ | 712/219 |
| 6,163,840 | A   | 12/2000 | Chrysos et al. ............. | 712/227 |
| 6,192,466 | B1  | 2/2001 | Gschwind .................... | 712/214 |
| 6,775,756 | B1  | 8/2004 | Thusoo et al. .............. | 711/169 |
| 6,862,676 | B1  | 3/2005 | Knapp et al. ................ | 712/217 |
| 6,880,069 | B1 * | 4/2005 | Carmean et al. ............ | 712/227 |

OTHER PUBLICATIONS

"Combination of Forwarding/Bypass Network with History File," U.S. Appl. No. 11/095,908, filed Mar. 31, 2005, pp. 1-30.

* cited by examiner

*Primary Examiner*—Eddie P Chan
*Assistant Examiner*—Jacob Petranek
(74) *Attorney, Agent, or Firm*—Robert A. Voigt, Jr.; Winstead, P.C.; Matthew Talpis

(57) ABSTRACT

A method, system and processor for improving the performance of an in-order processor. A processor may include an execution unit with an execution pipeline that includes a backup pipeline and a regular pipeline. The backup pipeline may store a copy of the instructions issued to the regular pipeline. The execution pipeline may include logic for allowing instructions to flow from the backup pipeline to the regular pipeline following the flushing of the instructions younger than the exception detected in the regular pipeline. By maintaining a backup copy of the instructions issued to the regular pipeline, instructions may not need to be flushed from separate execution pipelines and re-fetched. As a result, one may complete the results of the execution units to the architected state out of order thereby allowing the completion point to vary among the different execution pipelines.

10 Claims, 5 Drawing Sheets

PERFORMANCE OF AN IN-ORDER PROCESSOR BY NO LONGER REQUIRING A UNIFORM COMPLETION POINT ACROSS DIFFERENT EXECUTION PIPELINES

TECHNICAL FIELD

The present invention relates to the field of pipeline processing in an in-order processor, and more particularly to improving the performance of an in-order processor by no longer requiring a uniform completion point across different execution pipelines.

BACKGROUND INFORMATION

A "superscalar" processor has a processor architecture that allows more than one instruction to be executed in a single clock cycle. This may be accomplished using what is referred to as "pipeline processing." Pipeline processing may refer to overlapping operations by moving data or instructions into a conceptual pipe with all the stages of the pipe processing simultaneously. Accordingly, each instruction is processed as a sequence of stages, each being executable in parallel with stages of other instructions. Typically, an instruction is processed in five stages, namely fetch, decode, dispatch, execute and complete.

In the fetch stage, an instruction(s) is fetched from an instruction cache. In the decode stage, the fetched instruction(s) is decoded. In the dispatch stage, the decoded instruction(s) is dispatched or issued to the appropriate execution unit (e.g., fixed point unit, load/store unit, floating point unit, branch unit) to be executed. For example, if the decoded instruction is a floating point instruction, then the decoded instruction is dispatched to the floating point unit to be executed. In the execute stage, execution units execute the dispatched instructions. Upon executing the received instruction, the execution unit may transmit an indication to a unit, referred to herein as the "completion unit", indicating the execution of the received instruction. The completion unit may keep track of when these instructions have been "completed." An instruction may be said to be "completed" when it has been executed and is at a stage where any exception will not cause the reissuance of that instruction. This occurs during the complete stage. Once completed, the results are written into an "architected state" which may refer to a register that stores the written result and indicates that the instruction is completed.

In-order processors may refer to processors that fetch, execute and forward results to functional units in order. That is, instructions are issued and executed in order during stages as described above. In an architecture that employs such in-order processing, each execution pipeline (referring to the pipeline of the execution unit such as for the floating point unit, fixed point unit, load/store unit, branch unit) may typically have the same "completion point" and hence complete in order. An execution pipeline may refer to the stages that occur for the execution unit to execute that instruction. Each execution pipeline may have a different number of stages. For example, a floating point pipeline (pipeline of the floating point unit) may be longer than a load/store pipeline (pipeline of the load/store unit).

A completion point may refer to the point at which it is determined whether an exception occurred in that execution pipeline. An exception may refer to a condition that causes the program or microprocessor to branch to a different instruction stream, or to re-execute an instruction stream that has an error in it. When an exception, e.g., branch mispredict, occurs, the instructions that are "younger" (issued and executed after the instruction causing the exception) are flushed and re-fetched.

Each different execution unit in an in-order processor may have the same completion point since each instruction must be executed in order. When an exception occurs, all of the younger instructions not completed are flushed. These younger instructions may reside in multiple execution pipelines instead of residing in a single execution pipeline. In order to ensure that the instructions are executed in order, each execution pipeline may be required to have the same completion point. Furthermore, each execution pipeline may have the same completion point to simplify updating the architected state by allowing the architected state to be updated at a single cycle instead of being updated at different cycles.

By having the requirement of a single completion point for all the execution pipelines, the completion point may be lower (conceptually) in the pipeline than necessary. As stated above, each execution pipeline may have a different number of stages. However, since the completion point may have to be the same across all the different execution pipelines for an in-order processor, the completion point at each execution pipeline is at the same level as the completion point for the execution unit with the longest pipeline. As a result, the duration of the execute stage becomes unnecessarily longer for those pipelines with fewer stages than the longest execution pipeline.

Therefore, there is a need in the art to eliminate the requirement of having the completion point the same across the different execution pipelines in an in-order processor to improve processor performance.

SUMMARY

The problems outlined above may at least in part be solved in some embodiments by not requiring the completion point to be the same across the different execution pipelines. The completion point may be different for different execution pipelines by using an additional pipeline, referred to herein as the "backup pipeline", that contains a copy of the instructions issued to the "regular pipeline" (pipeline that normally is the sole pipeline for the execution unit) for an execution unit.

In one embodiment of the present invention, a method for improving the performance of an in-order processor may comprise the step of detecting an exception at or before a completion point for an execution pipeline where the execution pipeline comprises a backup pipeline and a regular pipeline. The backup pipeline stores a copy of instructions issued to the regular pipeline. The method may further comprise flushing instructions younger than an instruction causing the exception in the regular pipeline. The method may further comprise handling the detected exception. The method may further comprise allowing instructions to flow from the backup pipeline to the regular pipeline.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, processor and system for improving the performance of an in-order processor. In one embodiment of the present invention, a processor may include an execution unit with an execution pipeline that includes a backup pipeline and a regular pipeline. The backup pipeline may store a copy of the instructions issued to the regular pipeline. The execution pipeline may further include logic for detecting an exception at or before a completion point of the execution pipeline and flushing instructions younger than the instruction causing the exception in the regular pipeline. The execution pipeline may further include logic for allowing instructions to flow from the backup pipeline to the regular pipeline following the flushing of the younger instructions in the regular pipeline. By maintaining a backup copy of the instructions issued to the regular pipeline, instructions may not need to be flushed from separate execution pipelines and re-fetched if they do not depend upon the current execution pipeline. Furthermore, instructions flushed in the regular pipeline need not be re-fetched, only re-executed. By not requiring to re-fetch the flushed instructions from different execution pipelines, one may commit the results of the execution units to the architected state out of order thereby allowing the completion point to vary among the different execution pipelines.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
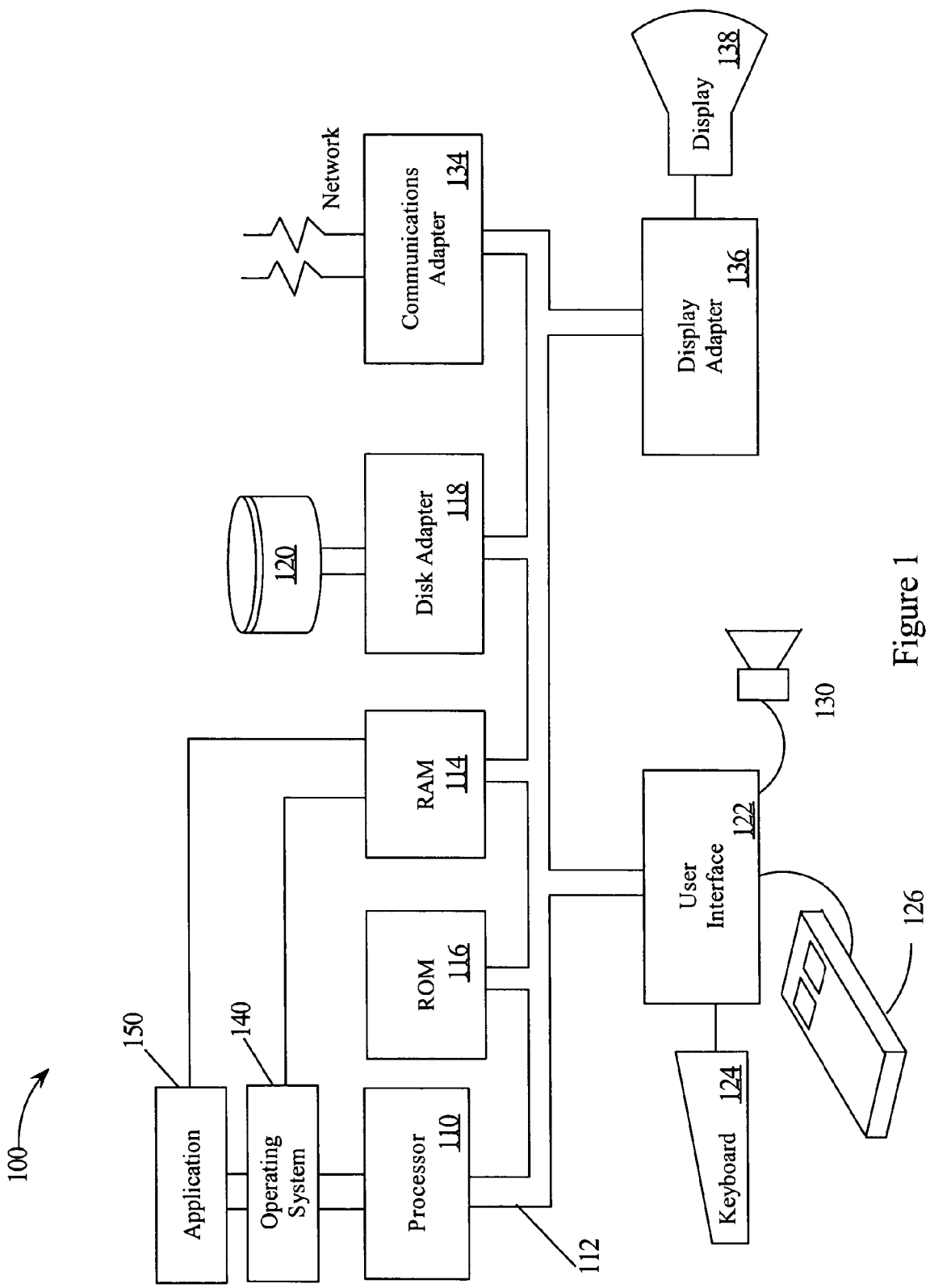
FIG. 1 illustrates a computer system in accordance with an embodiment of the present invention.

FIG. 1—Computer System

FIG. 1 illustrates a hardware configuration of computer system 100 which is representative of a hardware environment for practicing the present invention. Computer system 100 may have a processing unit 110 coupled to various other components by system bus 112. Processing unit 110 is described in further detail below in association with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., a disk drive.

Computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138.

FIG. 2—Processor

Figure 2:
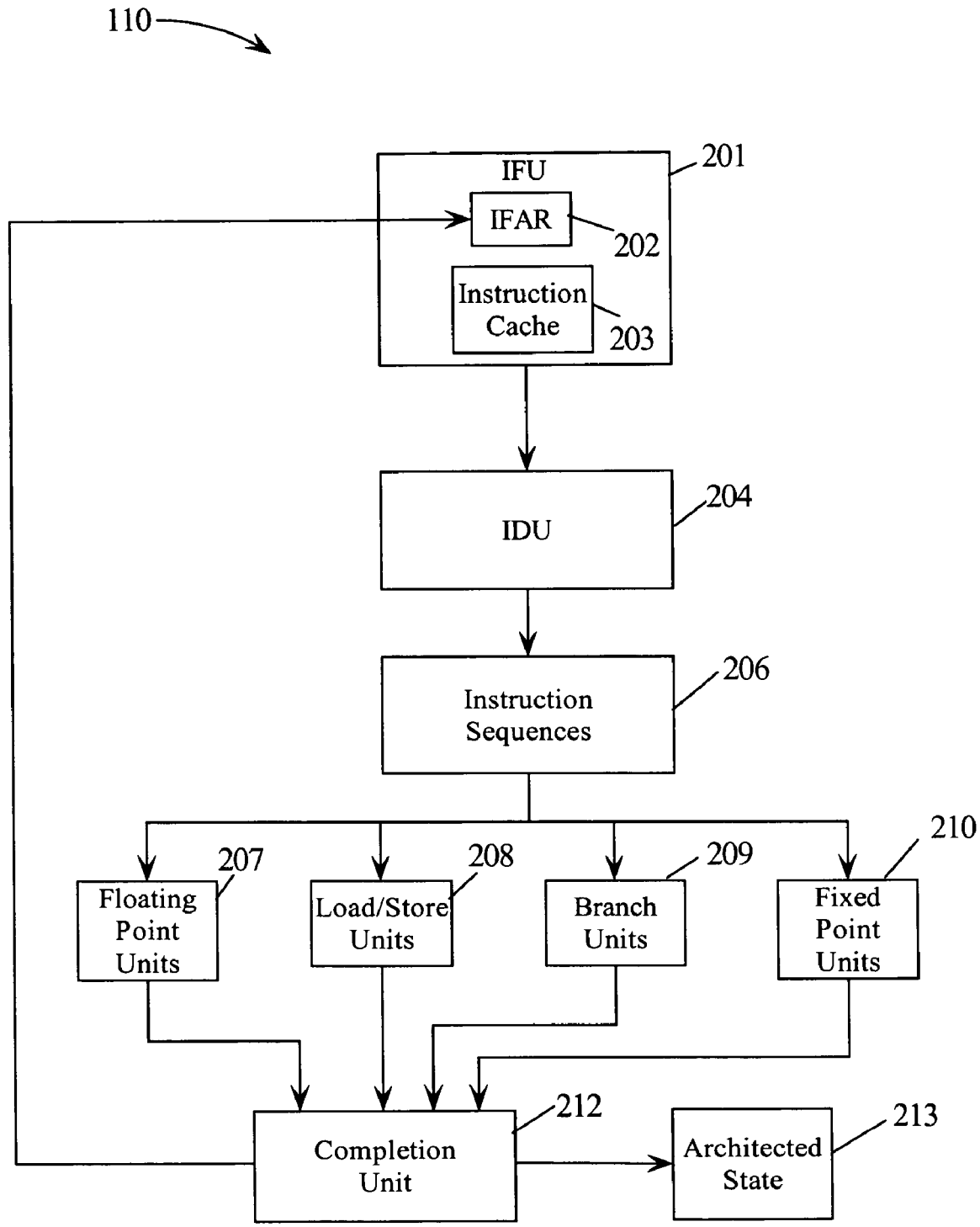
FIG. 2 illustrates a processor in a computer system in accordance with an embodiment of the present invention.

FIG. 2 illustrates an embodiment of the present invention of a processor 110. Processor 110 may be configured to issue, execute and complete instructions in order and hence may be referred to as an "in-order" processor. It is noted that processor 110 may include additional units, registers, buffers, memories, and other sections than illustrated in FIG. 2. These are not depicted or described for the sake of brevity.

Processor 110 may include an instruction fetch unit (IFU) 201 configured to load an address of an instruction, such as from a program counter, into an instruction fetch address register (IFAR) 202. The address retrieved by IFU 201 may be an effective address representing an address from the program or compiler. The instruction corresponding to the received effective address may be accessed from an instruction cache 203. Instructions may be inputted to instruction cache 203 from a system memory (not shown).

Instructions from instruction cache 203 may be outputted to instruction dispatch unit (IDU) 204. IDU 204 may be configured to decode these received instructions. IDU 204 may further be configured to forward the decoded instructions in order to an instruction sequencer 206 that includes a plurality of issue queues (not shown). A particular issue queue in instruction sequencer 206 may be coupled to one or more particular execution units, such as floating point units 207, load/store units 208, branch units 209 and fixed point units 210. Execution units 207, 208, 209 and 210 may be referred to collectively or individually as execution units 207, 208, 209 and 210, or as execution unit 207, 208, 209 and 210, respectively. Each execution unit 207, 208, 209, 210 may execute one or more instructions of a particular class of instructions. For example, fixed point units 210 may execute fixed point mathematical and logic operations on source operands, such as adding, subtracting, ANDing, ORing and XORing. Floating point units 207 may execute floating point operations on source operands, such as floating point multiplication and division.

Floating point units 207, load/store units 208, branch units 209 and fixed point units 210 may be configured to determine if an exception occurred at a completion point. If an exception occurred, the respective execution unit may handle the detected exception. Further, if an exception occurred, the respective execution unit may inform a "completion unit" 212 of the detected exception thereby allowing completion unit 212 to trigger a flush and a re-fetch. Further, execution units 207, 208, 209 and 210 may indicate the execution of the instruction to completion unit 212, along with any exception status, if applicable. The result of the execution of the instruction may be written into an "architected state" 213 when the instruction is "completed", or flushed and re-fetched if an exception occurred (as indicated by the line connecting completion unit 212 and IFAR 202). An instruction is completed when it has been executed and is at a stage where any exception will not cause the reissuance of that instruction. Architected state 213 may refer to a register that stores the written result and indicates that the instruction is completed.

As stated in the Background Information section, by having the requirement of a single completion point for all the execution pipelines in an in-order processor, the completion point may be lower (conceptually) in the pipeline than necessary. Since the completion point in prior art in-order processors may have to be the same across all the different execution pipelines, the completion point at each execution pipeline is at the same level as the completion point for the execution unit with the longest pipeline. As a result, the duration of the execute stage becomes unnecessarily longer for those pipelines with fewer stages than the longest execution pipeline. Therefore, there is a need in the art to eliminate the requirement of having the completion point the same across the different execution pipelines in an in-order processor to improve processor performance. The completion point may be different for different execution pipelines by using an additional pipeline, referred to herein as the "backup pipeline", that contains a copy of the instructions issued to the "regular pipeline" (pipeline that normally is the sole pipeline for the execution unit) for the execution unit as illustrated in FIG. 3.

Figure 3:
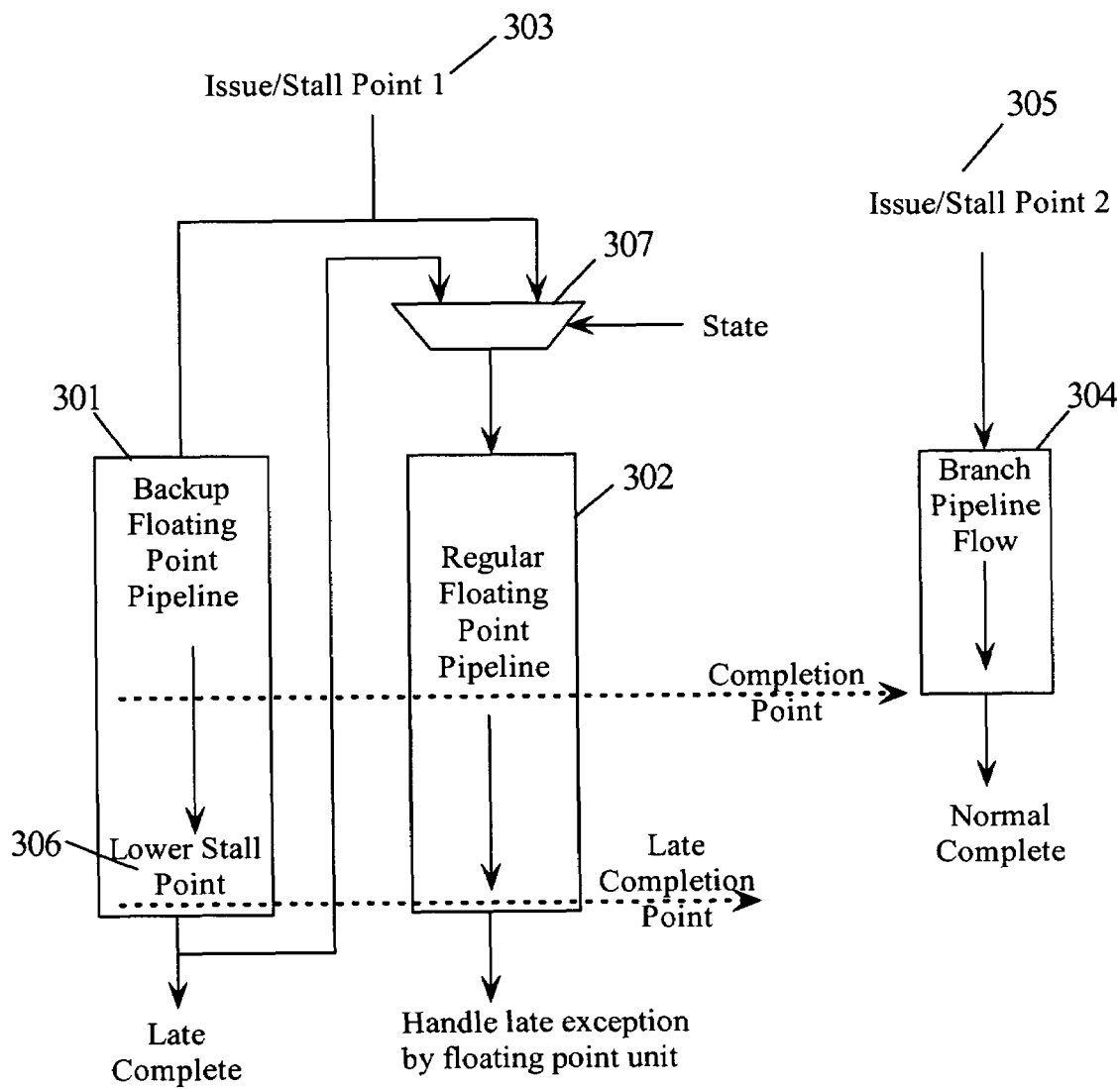
FIG. 3 is a diagram illustrating the use of a backup pipeline in an execution pipeline in order to enable different completion points across different execution pipelines in accordance with an embodiment of the present invention.

FIG. 3—Diagram Illustrating Use of a Backup Pipeline in Execution Pipeline to Enable Different Completion Points Across Different Execution Pipelines.

FIG. 3 is a diagram illustrating the use of a backup pipeline in the execution pipeline in order to enable different completion points across different execution pipelines in an in-order processor in accordance with an embodiment of the present invention. It is noted that FIG. 3 illustrates floating point unit 207 (FIG. 2) as having the longest execution pipeline and hence having a backup pipeline as well as illustrates a branch unit 209 (FIG. 2) having a pipeline that is shorter. It is further noted that the illustration of floating point unit 207 having the longest execution pipeline and branch unit 209 having a shorter execution pipeline is for illustration purposes. It is further noted that the principles of the present invention presented herein may be applied to any execution unit.

Referring to FIG. 3, floating point unit 207 may include two separate execution pipelines referred to herein as the "backup pipeline" 301 and the "regular pipeline" 302. Each of these pipelines 301, 302 receives the same instructions issued from issue queues 206 (FIG. 2) at issue/stall point #1 303. Issue/stall point #1 303 may refer to the point of issuance of instructions to floating point unit 207.

FIG. 3 further illustrates an execution pipeline 304 of branch unit 209. Pipeline 304 receives the instructions issued from issue queues 206 (FIG. 2) at issue/stall point #2 305. Issue/stall point #2 305 may refer to the point of issuance of instructions to branch unit 209. Issue/stall point #2 305 may or may not be at the same point of issuance as issue/stall point #1 303.

As illustrated in FIG. 3, the completion point for branch execution pipeline 304 is earlier than the completion point for floating point execution pipelines 301, 302. The completion point may be later for floating point execution pipelines 301, 302 than branch execution pipeline 304 since there are a greater number of stages in the floating point execution pipeline 301, 302. Branch unit 209 may not be required to have the completion point at the same level as floating point unit 207.

When an exception is detected at or before the completion point for execution pipelines 301, 302, the issue/stall point 303 for floating point unit 207 is asserted to prevent instructions from being issued into execution pipelines 301, 302 from issue queues 206. Further, when an exception is detected at or before the completion point for execution pipelines 301, 302, a stall point, referred to herein as the "lower stall point" 306, in backup pipeline 301 is asserted to prevent instructions from flowing out of backup pipeline 301. Lower stall point 306 may refer to the point of issuing the result of an executed instruction in backup pipeline 301 to completion unit 212 from floating point unit 207.

Further, upon detecting an exception at or before the completion point for execution pipelines 301, 302, the instructions younger than the instruction causing the exception in regular pipeline 302 are flushed. The detected exception is handled by floating point unit 207. Once the younger instructions are flushed, and the exception is handled, lower stall point 306 is de-asserted to allow instructions to flow from backup pipeline 301 to regular pipeline 302. In one embodiment, backup pipeline 301 may send a single instruction at a time to regular pipeline 302 where each instruction is sent after completion of the prior instruction that was sent to regular pipeline 302. In another embodiment, lower stall point 306 may be configured to issue instructions to regular pipeline 302 as if these instructions were issued from issue queues 206. For example, lower stall point 306 may be connected to logic (not shown) with the capability of determining the number of cycles that should be inserted between two consecutively issued instructions. In another embodiment, "nested" exceptions may be handled by including a multiplexer (not shown) prior to backup pipeline 301. For example, if one of the instructions re-executing from backup pipeline 301 to regular pipeline 302 has an exception, then the instructions are still in the backup pipeline 301 to re-execute after handling the new exception. In one embodiment, a multiplexer 307 may be used to select either the instructions issued from issue queues 206 or from backup pipeline 301 to be inputted into regular pipeline 302. The selection may be determined based on a "state" which creates a signal inputted to multiplexer 307. Backup pipeline 301 is selected from when the exception is detection to when backup pipeline 301 is "drained".

Upon completion of draining backup pipeline 301, upper stall point 303 is de-asserted to allow instructions to be issued into both backup pipeline 301 and regular pipeline 302 thereby resuming normal operation.

By having backup pipeline 301 refill regular pipeline 302 instead of re-fetching the flushed instructions, regular pipeline 302 may be filled quicker thereby saving time and improving processor performance. Further, by having backup pipeline 301, the completion point in pipelines 301, 302 may be different than other execution pipelines since backup pipeline 301 maintains a backup copy of the instructions issued to regular pipeline 302. By maintaining a backup copy of the instructions issued to regular pipeline 302, instructions younger than the exception-causing instruction in different execution pipelines do not need to be flushed if they do not depend upon the exception-causing instruction. Hence, instructions may be received and completed after the detection of the exception in different execution pipelines. Further, by not requiring to re-fetch the flushed instructions from different execution pipelines, one may commit the results of the execution units to architected state 213 (FIG. 2) out of order thereby allowing the completion point to vary among the different execution pipelines.

By enabling different completion points across different execution pipelines, some execution pipelines will now have a completion point that occurs earlier thereby reducing the duration of the execution process. By reducing the duration of the execution process, fewer stages are needed and hence "bypasses" may be eliminated thereby saving wiring costs, complexity and area. A bypass may refer to wiring a result computed after a stage in the execution pipeline to the beginning of the execution pipeline if the execution unit needs a value recently computed at a further down stage in the execution pipeline. By reducing the number of required stages, the number of bypasses may be reduced and hence reduce wiring and complexity.

Figure 4A:
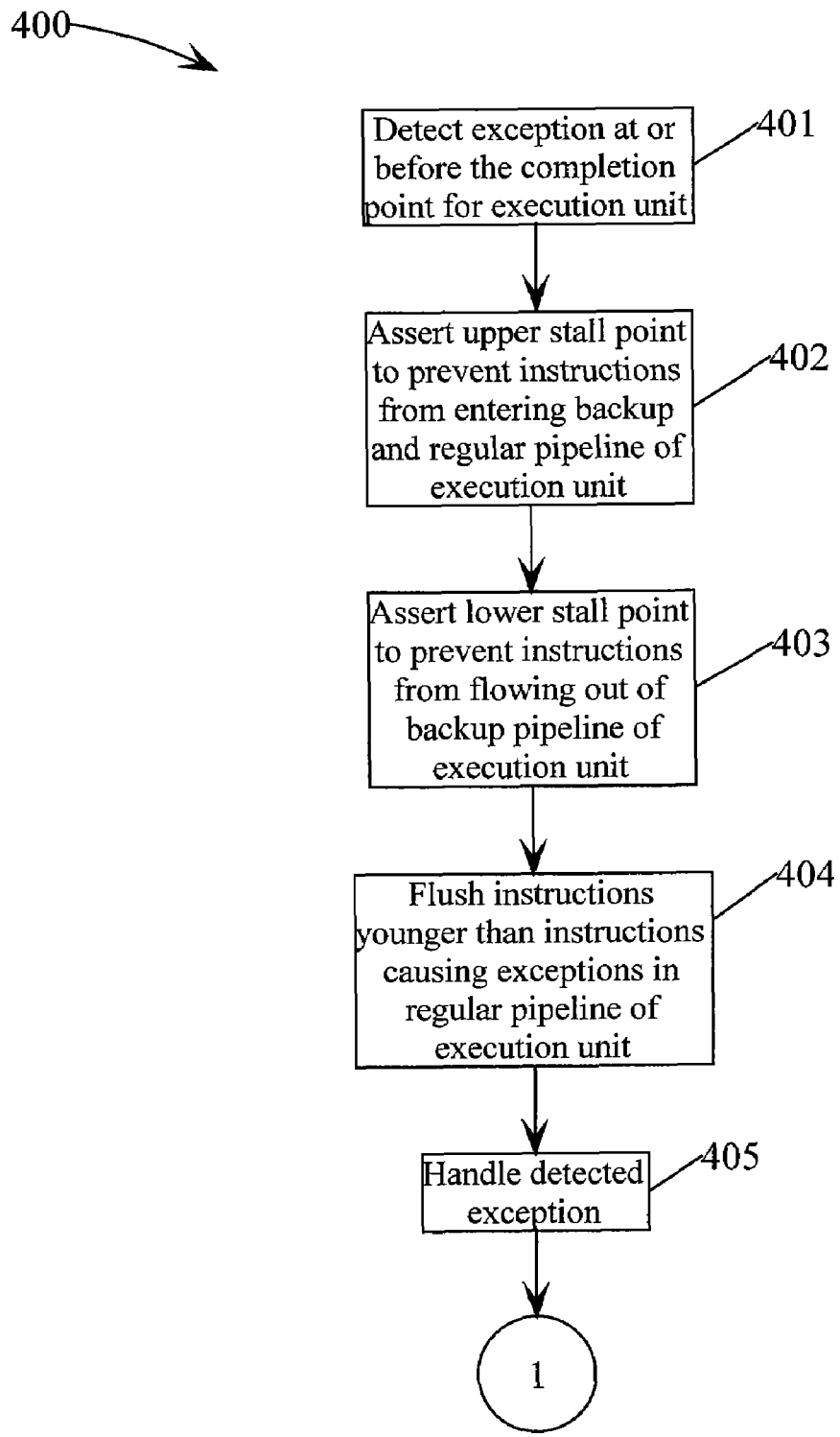
FIGS. 4A-B are a flowchart of a method for allowing different completion points across different execution pipelines in accordance with an embodiment of the present invention.
Figure 4B:
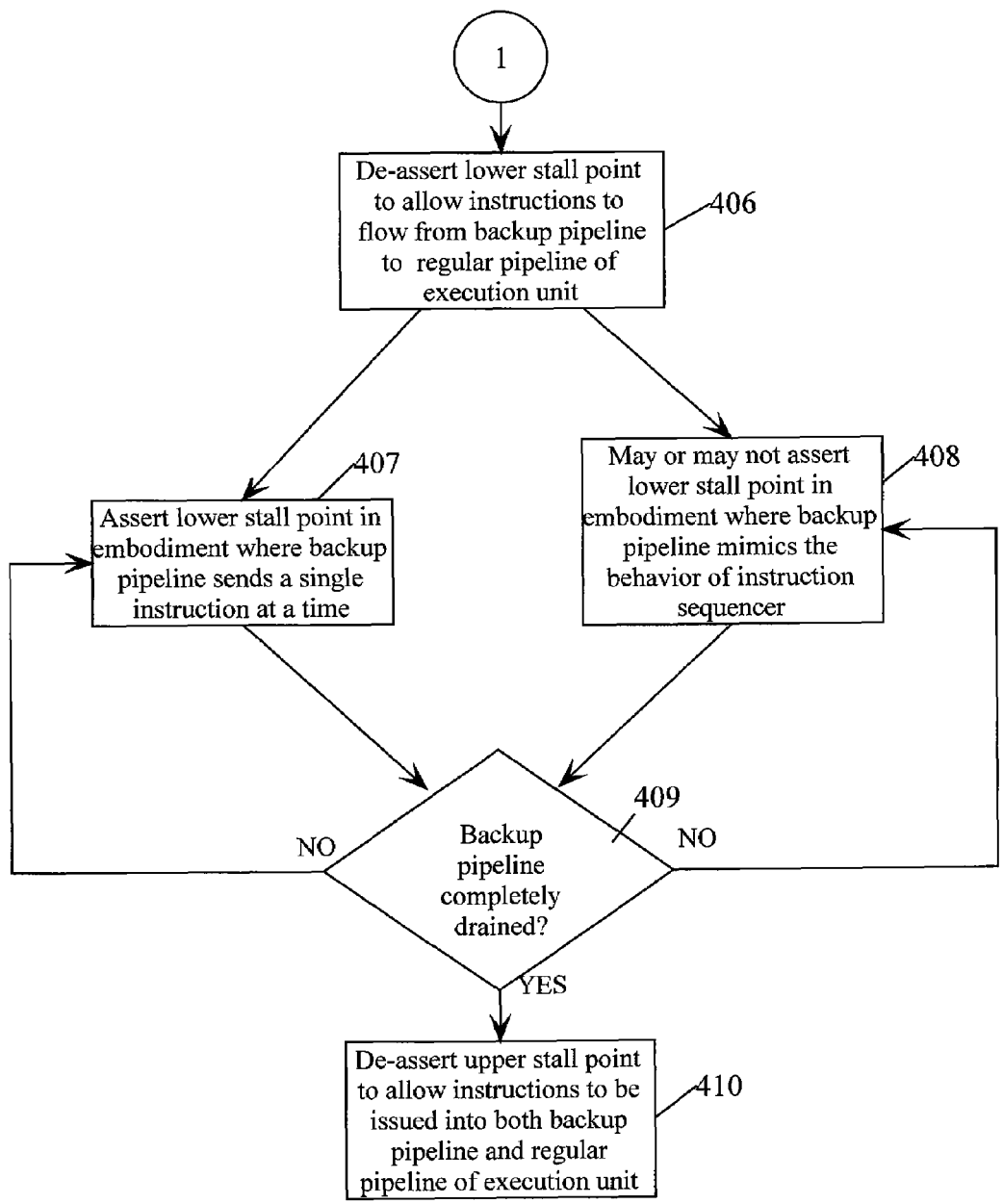

A more detail discussion of having completion points different for different execution pipelines using the illustrative embodiment described above is described below in association with FIGS. 4A-B. FIGS. 4A-B are a flowchart of a method for allowing different completion points across different execution pipelines.

FIGS. 4A-B—Method for Allowing Different Completion Points Across Different Execution Pipelines 4A-B are a flowchart of one embodiment of the present invention of a method 400 for allowing different completion points across different execution pipelines.

Referring to FIG. 4A, in conjunction with FIGS. 1-3, in step 401, the execution unit, e.g., floating point unit 207, detects an exception at or before the completion point. The following description will describe floating point unit 207 as being the execution unit with a backup pipeline 301; however, it is noted that any execution unit may have the embodiment on the left of FIG. 3.

In step 402, floating point unit 207 asserts issue/stall point 303 to prevent instructions from being issued into execution pipelines 301, 302 from issue queues 206. In step 403, floating point unit 207 asserts lower stall point 306 in backup pipeline 301 to prevent instructions from flowing out of backup pipeline 301.

In step 404, floating point unit 207 flushes instructions in regular pipeline 302 younger than the instruction causing the exception detected. In step 405, floating point unit 207 handles the detected exception.

Referring to FIG. 4B, upon completion of handling the detected exception, floating point unit 207 de-asserts lower stall point 306 to allow instructions to flow from backup pipeline 301 to regular pipeline 302 in step 406.

In the embodiment described above where backup pipeline 301 sends a single instruction at a time to regular pipeline 302 after completion of the prior instruction that was sent to regular pipeline 302, lower stall point 306 is asserted in step 407 during the draining of backup pipeline 301 until the previous instruction is completed.

Alternatively, in another embodiment, backup pipeline 301 mimics the behavior of instruction sequencer 206 in that instructions are reissued from backup pipeline 301 to regular pipeline 302 as if the instructions were originally issued from instruction sequencer 206. In this alternative embodiment, lower stall point 306 may or may not be asserted in step 408.

A determination is made as to whether backup pipeline 301 is completely drained in step 409. If not, then method 400 proceeds to either step 407 or 408 depending on the particular embodiment enacted as described above. Otherwise, floating point unit 207 de-asserts upper stall point 303 in step 410 to allow instructions to be issued into both backup pipeline 301 and regular pipeline 302 thereby resuming normal operation.

It is noted that method 400 may include other and/or additional steps that, for clarity, are not depicted. It is further noted that method 400 may be executed in a different order presented and that the order presented in the discussion of FIGS. 4A-B is illustrative. It is further noted that certain steps in method 400 may be executed in a substantially simultaneous manner.

Although the method, system and processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for improving the performance of an in-order processor comprising the steps of:

detecting an exception at or before a completion point for an execution pipeline, wherein said execution pipeline comprises a backup pipeline and a regular pipeline, wherein said backup pipeline stores a copy of instructions issued to said regular pipeline, and wherein the backup pipeline and the regular pipeline have an equal number of pipeline stages;

asserting an upper stall point to prevent instructions from entering said backup pipeline and said regular pipeline prior to said flushing of instructions younger than said instruction causing said exception in said regular pipeline;

asserting a lower stall point to prevent instructions from flowing out of said backup pipeline prior to said flushing of instructions younger than said instruction causing said exception in said regular pipeline;

flushing instructions younger than an instruction causing said exception in said regular pipeline;

handling said detected exception;

de-asserting said lower stall point to allow instructions to flow from said backup pipeline to said regular pipeline; and allowing instructions to flow from said backup pipeline to said regular pipeline.

2. The method as recited in claim 1 further comprising the step of:

de-asserting said upper stall point to allow instructions to be issued into said backup pipeline and said regular pipeline after said flushing of instructions younger than said instruction causing said exception in said regular pipeline and after handling said detected exception.

3. A system comprising:

a processor;

a memory unit;

an input mechanism;

an output mechanism;

a bus coupling said processor to memory unit, said input mechanism and said output mechanism, wherein said processor comprises:

a fetch unit configured to retrieve instructions;

a dispatch unit coupled to said fetched unit, wherein said dispatch unit is configured to decode said retrieved instructions;

a plurality of instruction queues coupled to said dispatch unit, wherein said plurality of instruction queues are configured to dispatch said decoded instructions to an execution unit; and a plurality of execution units coupled to said plurality of instruction queues, wherein said plurality of execution units are configured to execute said dispatched decoded instructions;

wherein a first of said plurality of execution units contains logic to perform:

detecting an exception at or before a completion point for its execution pipeline, wherein said execution pipeline of said first of said plurality of execution units comprises a backup pipeline and a regular pipeline, wherein said backup pipeline stores a copy of decoded instructions issued to said regular pipeline from said plurality of instruction queues, and wherein the backup pipeline and the regular pipeline have an equal number of pipeline stages;

asserting an upper stall point to prevent instructions from entering said backup pipeline and said regular pipeline prior to said flushing of instructions younger than said instruction causing said exception in said regular pipeline;

asserting a lower stall point to prevent instructions from flowing out of said backup pipeline prior to said flushing of instructions younger than said instruction causing said exception in said regular pipeline;

flushing instructions younger than an instruction causing said exception in said regular pipeline;

de-asserting said lower stall point to allow instructions to flow from said backup pipeline to said regular pipeline; and allowing instructions to flow from said backup pipeline to said regular pipeline.

4. The system as recited in claim 3, wherein said first of said plurality of execution units contains logic to further perform:

de-asserting said upper stall point to allow instructions to be issued into said backup pipeline and said regular pipeline after said flushing of instructions younger than said instruction causing said exception in said regular pipeline and after handling said detected exception.

5. The system as recited in claim 3, wherein said first of said plurality of execution units has a longest execution pipeline of said plurality of execution units.

6. The system as recited in claim 3, wherein said first of said plurality of execution units comprises a floating point unit.

7. A processor, comprising:

a fetch unit configured to retrieve instructions;

a dispatch unit coupled to said fetched unit, wherein said dispatch unit is configured to decode said retrieved instructions;

a plurality of instruction queues coupled to said dispatch unit, wherein said plurality of instruction queues are configured to dispatch said decoded instructions to an execution unit; and a plurality of execution units coupled to said plurality of instruction queues, wherein said plurality of execution units are configured to execute said dispatched decoded instructions;

wherein a first of said plurality of execution units contains logic to perform:

detecting an exception at or before a completion point for its execution pipeline, wherein said execution pipeline of said first of said plurality of execution units comprises a backup pipeline and a regular pipeline, wherein said backup pipeline stores a copy of decoded instructions issued to said regular pipeline from said plurality of instruction queues, and wherein the backup pipeline and the regular pipeline have an equal number of pipeline stages;

asserting an upper stall point to prevent instructions from entering said backup pipeline and said regular pipeline prior to said flushing of instructions younger than said instruction causing said exception in said regular pipeline;

asserting a lower stall point to prevent instructions from flowing out of said backup pipeline prior to said flushing of instructions younger than said instruction causing said exception in said regular pipeline;

flushing instructions younger than an instruction causing said exception in said regular pipeline;

de-asserting said lower stall point to allow instructions to flow from said backup pipeline to said regular pipeline; and allowing instructions to flow from said backup pipeline to said regular pipeline.

8. The processor as recited in claim 7, wherein said first of said plurality of execution units contains logic to further perform:

de-asserting said upper stall point to allow instructions to be issued into said backup pipeline and said regular pipeline after said flushing of instructions younger than said instruction causing said exception in said regular pipeline and after handling said detected exception.

9. The processor as recited in claim 7, wherein said first of said plurality of execution units has a longest execution pipeline of said plurality of execution units.

10. The processor as recited in claim 7, wherein said first of said plurality of execution units comprises a floating point unit.

* * * * *